US008781092B2

(12) United States Patent
Noble, Jr.

(10) Patent No.: US 8,781,092 B2
(45) Date of Patent: Jul. 15, 2014

(54) SYSTEMS AND METHODS FOR CALLBACK PROCESSING

(75) Inventor: James K. Noble, Jr., Marietta, GA (US)

(73) Assignee: Noble Systems Corporation, Atlanta, GA (US)

( * ) Notice: Subject to any disclaimer, the term of this patent is extended or adjusted under 35 U.S.C. 154(b) by 1431 days.

(21) Appl. No.: 11/290,113

(22) Filed: Nov. 30, 2005

(65) Prior Publication Data

US 2006/0256949 A1    Nov. 16, 2006

Related U.S. Application Data

(60) Provisional application No. 60/681,410, filed on May 16, 2005.

(51) Int. Cl.
*H04M 3/42*    (2006.01)
(52) U.S. Cl.
USPC ............................... 379/210.01; 379/209.01
(58) Field of Classification Search
USPC ................... 379/210.01, 40, 51, 100.14, 200, 379/265.01–266.09
See application file for complete search history.

(56) References Cited

U.S. PATENT DOCUMENTS

| 4,788,715 A | 11/1988 | Lee |
| 4,800,583 A | 1/1989 | Theis |
| 4,829,563 A | 5/1989 | Crockett et al. |
| 4,881,261 A | 11/1989 | Oliphant et al. |
| 4,896,345 A | 1/1990 | Thorne |
| 5,020,095 A | 5/1991 | Morganstein et al. |
| 5,036,535 A | 7/1991 | Gechter et al. |
| 5,181,236 A | 1/1993 | LaVallee et al. |
| 5,185,782 A | 2/1993 | Srinivasan |
| 5,309,505 A | 5/1994 | Szlam et al. |
| 5,371,787 A | 12/1994 | Hamilton |
| 5,436,965 A | 7/1995 | Grossman et al. |

(Continued)

FOREIGN PATENT DOCUMENTS

| WO | WO03/028356 A1 | 4/2003 |
| WO | WO2004/017620 A1 | 2/2004 |

OTHER PUBLICATIONS

Aspect, "Aspect Scheduled Callback," copyrighted Jan. 2005, Aspect Communications Corporation (4 pages).

(Continued)

*Primary Examiner* — Simon Sing
*Assistant Examiner* — Solomon Bezuayehu

(57) ABSTRACT

Systems and methods for allowing a call center to accept and schedule callback appointments for the service of inbound calls at times which are convenient for the inbound caller as well as automatically placing an outbound call at the scheduled callback time. The system collects information from the caller when scheduling a callback time which assists the agent with servicing the scheduled callback more efficiently than the original incoming call. The system also uses algorithms and various system parameters to determine how many agents are needed to service all scheduled callbacks at a given time while maximizing the efficiency of the agents by avoiding having agents service callbacks which fail to reach the person to be serviced for various reasons. When not enough agents are available to handle the scheduled callbacks and current incoming calls the called back individual is automatically connected to the next available agent avoiding the line of incoming calls entirely. This results in not only increasing the efficiency of the agents it also decreases the time necessary for the call center to provide for the scheduling of future callbacks.

38 Claims, 3 Drawing Sheets

(56) References Cited

U.S. PATENT DOCUMENTS

| | | | |
|---|---|---|---|
| 5,479,487 A | 12/1995 | Hammond | |
| 5,495,284 A * | 2/1996 | Katz | 348/14.09 |
| 5,519,773 A * | 5/1996 | Dumas et al. | 379/265.05 |
| 5,533,109 A | 7/1996 | Baker | |
| 5,559,878 A | 9/1996 | Keys et al. | |
| 5,625,682 A | 4/1997 | Gray et al. | |
| 5,627,884 A | 5/1997 | Williams et al. | |
| 5,633,922 A | 5/1997 | August et al. | |
| 5,703,935 A | 12/1997 | Raissyan et al. | |
| 5,724,420 A | 3/1998 | Torgrim | |
| 5,761,289 A | 6/1998 | Keshav | |
| 5,809,128 A | 9/1998 | McMullin | |
| 5,815,566 A | 9/1998 | Ramot et al. | |
| 5,822,400 A | 10/1998 | Smith | |
| 5,828,731 A | 10/1998 | Szlam et al. | |
| 5,958,014 A | 9/1999 | Cave | |
| 6,002,760 A | 12/1999 | Gisby | |
| 6,111,940 A | 8/2000 | Kugell | |
| RE37,073 E * | 2/2001 | Hammond | 379/67.1 |
| 6,192,050 B1 | 2/2001 | Stovall | |
| 6,208,970 B1 | 3/2001 | Ramanan | |
| 6,212,268 B1 | 4/2001 | Nielsen | |
| 6,226,360 B1 | 5/2001 | Goldberg et al. | |
| 6,259,786 B1 | 7/2001 | Gisby | |
| 6,263,066 B1 | 7/2001 | Shtivelman et al. | |
| 6,292,551 B1 | 9/2001 | Entman et al. | |
| 6,411,805 B1 | 6/2002 | Becker et al. | |
| 6,418,217 B1 | 7/2002 | Ukon | |
| 6,493,447 B1 | 12/2002 | Goss et al. | |
| 6,600,821 B1 | 7/2003 | Chan et al. | |
| 6,633,639 B1 | 10/2003 | Ludford | |
| 6,650,748 B1 | 11/2003 | Edwards et al. | |
| 6,654,367 B1 * | 11/2003 | Kaufman | 370/356 |
| 6,681,006 B1 | 1/2004 | Pilkington et al. | |
| 6,704,404 B1 | 3/2004 | Burnett | |
| 6,721,778 B1 | 4/2004 | Smith et al. | |
| 6,724,885 B1 * | 4/2004 | Deutsch et al. | 379/265.02 |
| 6,754,334 B2 | 6/2004 | Williams et al. | |
| 6,771,760 B1 | 8/2004 | Vortman et al. | |
| 6,782,087 B1 | 8/2004 | Atkinson et al. | |
| 6,801,520 B2 | 10/2004 | Philonenko | |
| 6,826,529 B1 | 11/2004 | Zhang et al. | |
| 6,847,713 B1 | 1/2005 | Cutting et al. | |
| 6,865,258 B1 | 3/2005 | Polcyn | |
| 6,879,674 B2 | 4/2005 | Strandberg | |
| 6,879,683 B1 | 4/2005 | Fain et al. | |
| 6,885,741 B1 | 4/2005 | Puckett et al. | |
| 6,931,112 B1 | 8/2005 | McFarland et al. | |
| 6,950,505 B2 | 9/2005 | Longman et al. | |
| 7,010,115 B2 | 3/2006 | Dezonno et al. | |
| 7,106,851 B2 | 9/2006 | Tang et al. | |
| 7,133,828 B2 * | 11/2006 | Scarano et al. | 704/251 |
| 7,145,998 B1 | 12/2006 | Holder et al. | |
| 7,190,774 B2 | 3/2007 | McFarland | |
| 7,215,745 B2 | 5/2007 | Peters | |
| 7,221,739 B1 | 5/2007 | Khan et al. | |
| 7,224,791 B2 | 5/2007 | Haukilahti | |
| 7,231,232 B2 | 6/2007 | Osann, Jr. | |
| 7,236,577 B2 | 6/2007 | Lection et al. | |
| 7,257,217 B1 * | 8/2007 | Lee | 379/265.01 |
| 7,266,181 B1 | 9/2007 | Zirngibl et al. | |
| 7,272,212 B2 | 9/2007 | Eberle et al. | |
| 7,274,787 B1 | 9/2007 | Schoeneberger | |
| 7,302,051 B1 * | 11/2007 | Strandberg | 379/210.01 |
| 7,315,518 B1 | 1/2008 | Siegrist | |
| 7,327,831 B2 | 2/2008 | Tobin | |
| 7,369,650 B1 | 5/2008 | Bhusri | |
| 7,376,226 B2 | 5/2008 | Holder et al. | |
| 7,389,254 B2 | 6/2008 | McCleery | |
| 7,454,004 B2 | 11/2008 | Shvadron | |
| 7,457,396 B2 | 11/2008 | Claudatos et al. | |
| 7,469,044 B2 * | 12/2008 | Kramarz-Von Kohout | 379/209.01 |
| 8,155,297 B1 * | 4/2012 | Dhir et al. | 379/210.01 |
| 2001/0040887 A1 * | 11/2001 | Shtivelman et al. | 370/352 |
| 2002/0018546 A1 * | 2/2002 | Horne | 379/142.06 |
| 2002/0085704 A1 | 7/2002 | Shires | |
| 2002/0101977 A1 | 8/2002 | Takeuchi et al. | |
| 2002/0141557 A1 | 10/2002 | Strandberg | |
| 2002/0196926 A1 | 12/2002 | Johnson et al. | |
| 2003/0002651 A1 | 1/2003 | Shires | |
| 2003/0026408 A1 | 2/2003 | Mashimo et al. | |
| 2003/0035531 A1 | 2/2003 | Brown et al. | |
| 2003/0037113 A1 | 2/2003 | Petrovykh | |
| 2003/0063732 A1 * | 4/2003 | Mcknight | 379/210.01 |
| 2003/0101222 A1 * | 5/2003 | Lyonnaz | 709/205 |
| 2003/0235287 A1 | 12/2003 | Margolis | |
| 2004/0008832 A1 | 1/2004 | Mashimo et al. | |
| 2004/0024647 A1 * | 2/2004 | Cheung | 705/26 |
| 2004/0081309 A1 | 4/2004 | Bickford et al. | |
| 2004/0081311 A1 | 4/2004 | Thompson | |
| 2004/0120484 A1 * | 6/2004 | Buzbee | 379/93.17 |
| 2004/0170258 A1 * | 9/2004 | Levin et al. | 379/88.01 |
| 2004/0179672 A1 | 9/2004 | Pagel et al. | |
| 2004/0218750 A1 | 11/2004 | Atkinson et al. | |
| 2004/0228470 A1 | 11/2004 | Williams et al. | |
| 2005/0278177 A1 | 12/2005 | Gottesman | |
| 2006/0002538 A1 | 1/2006 | Dezonno | |
| 2006/0029203 A1 | 2/2006 | Bhusri | |
| 2006/0104433 A1 * | 5/2006 | Simpson et al. | 379/266.07 |
| 2006/0140375 A1 * | 6/2006 | Paden et al. | 379/210.01 |
| 2006/0167729 A1 * | 7/2006 | Rafter et al. | 705/8 |
| 2006/0245577 A1 | 11/2006 | Mancuso et al. | |
| 2006/0256932 A1 | 11/2006 | Bushey et al. | |
| 2007/0291924 A1 | 12/2007 | Matula | |
| 2008/0226055 A1 | 9/2008 | Holder et al. | |
| 2009/0010414 A1 | 1/2009 | Siegrist | |
| 2009/0022284 A1 | 1/2009 | Matula | |

OTHER PUBLICATIONS

Avaya, "IP Office Compact Center Software Version 4," website: http://support.avaya.com/japple/css/japple?temp. documentID=153559&temp . . . , downloaded May 10, 2005 (15 pages).

Servion, "Servion Announces Callback Manager with Natural Language Interface," website: http://www.servion.com/news26.htm, downloaded May 10, 2005 (2 pages).

Alston Tascom, Inc., "Evolution Outbound Dialing," 13512 Vintage Pl, Chino, CA 91710, website: www.alstontascom.com (2 pages), Feb. 8, 2003

* cited by examiner

SYSTEMS AND METHODS FOR CALLBACK PROCESSING

RELATED APPLICATIONS

The present application claims priority to U.S. Provisional Patent Application Ser. No. 60/681,410, filed May 16, 2005, which is hereby incorporated by reference as if set forth fully herein.

FIELD OF THE INVENTION

The invention is related to the field of telephony and communications. More particularly, the invention relates to automated call distribution technology.

BACKGROUND OF THE INVENTION

Automated call distribution devices or call centers provide a way to handle large loads of incoming telephone calls for a particular business by routing the calls to the appropriate recorded information or service agent which can handle that particular call. However, many times demand for servicing these incoming calls exceeds the amount of service agents which can handle these calls. This results in incoming calls which must be placed on hold until agents can service the calls. Unfortunately, sometimes the amount of time on hold can be of significant inconvenience for the caller. As a result, several automated call distribution devices automatically schedule a callback appointment for an incoming call which cannot be serviced at the time the call was received. Once the scheduled callback time occurs an agent will place an outbound call to the person who placed an earlier incoming call to provide immediate assistance to the callback recipient without the recipient having to wait on hold for an extended period of time.

While this practice is a significant convenience for many customers, often it can create inconveniences and added expenses to a company's automated call center system as well as the associated agents. The scheduling of callbacks for off-peak calling times can be unpredictable resulting in agent inefficiencies and call center management issues, such as staffing the correct number of servicing agents at particular times of the day. Also, peak calling periods and callback appointments may inadvertently overlap resulting in prolonged peak calling periods when not all incoming calls can be serviced. This problem could compound to the point that more callbacks are serviced by agents than first time calls.

Additionally, in current callback systems, the efficiency of agents servicing customers is not maximized. For instance, when an outbound call is placed to service a callback appointment, many times the customer to be serviced does not answer the phone, is unavailable, will no longer require assistance, etc. Thus, in conventional automated callback systems, the inconveniences and inefficiencies customers experienced before having the option of a scheduled callback have shifted to the agents who service the calls. Thus, there is an unsatisfied need to mitigate and control the inconveniencies, and in some cases the unpredictable nature, of conventional callback systems.

SUMMARY OF THE INVENTION

The present invention is directed to systems and methods for conducting a callback request for a caller, wherein a method according to an embodiment of the present invention includes the steps of accepting an inbound call from a caller over a telephone line and estimating a hold time for transfer of the call to an agent. Based at least in part on the length of the hold time, the caller is presented with a callback option to schedule a callback. Alternatively, the callback option may be made available only to callers who satisfy particular customer criteria such as a customer telephone number, account number, or customer status level, or the caller may be given the option to either remain on hold or exercise the callback option at any point during the time they are holding.

Once the callback option has been initiated, the system collects callback information, some of which may be provided by the caller, such as a callback telephone number, a time for initiating the callback, additional identifying information such as an account number, transaction number, product serial number, confirmation number, etc. Additionally, the system may acquire the subject matter of or reason for the call. Next, the system records at least some of the callback information into a database and then confirms with the caller the callback telephone number and the time for initiating the callback. In an alternative embodiment of the present invention, the caller may be provided a next available callback time, the caller may input a desired callback time, or the call may be presented with callback time options from which to select to aid in the caller's callback scheduling decision-making.

An aspect of the present invention for conducting a callback to a previous caller includes the steps of retrieving callback information from a database, wherein the callback information includes the callback telephone number and the time for initiating the callback. Additional identifying information may also be retrieved from the database such as an account number, transaction number, product serial number, confirmation number, etc. Also, the subject matter of or reason for the call may also be retrieved from a database. Next, an outbound call is initiated from a call center by automatically dialing the phone number retrieved from the database. The outbound call is then monitored. The system will process the call based on the response to the outbound call, such as, whether it is answered by a person, machine or service tones.

If the call results in a connection, the call may be routed to an available agent. When the call is being routed to the agent, the system may also route callback information stored in the database that relate to the call being routed to the agent. Alternatively, if the call results in a connection and an agent is unavailable to handle the connected call, the caller may be played a message, for example, informing the caller that they are to be connected to the next available agent.

If the monitoring of the outbound call results in the detection by the system or, alternatively, by an agent, that the call was answered by an answering machine (e.g., recording machine, answering service, voicemail, privacy director, etc.), then the system may automatically play a pre-recorded message for the answering machine. Additionally, the system may submit another outbound call to the same callback number after a pre-defined period of time. Similarly, if the outbound call results in detecting a busy signal, the system may reinitiate an outbound call from the call center to the callback telephone number after a predetermined length of time. Further, if a predetermined number of rings occurs without detecting a connection signal, the system will also reinitiate an outbound call from the call center to the callback telephone number after a predetermined period of time. Alternatively, if the monitoring of the outbound call results in the detection of a service signal (e.g., disconnected or not in service signal), the system may update the related callback information from the database or otherwise note that service tones were received.

Another aspect of the present invention is a callback system that includes an automatic call distributor connected to a telephone network and in direct communication with a predictive dialer. The system further includes one or more agents also connected to the automatic call distributor. The predictive dialer is also connected to the telephone network. When an outbound callback call results in a connection that is determined to be answered by a person, an agent is allocated to handle the call. The call is routed from the predictive dialer to the automated call distributor and through the automatic call distributor to the allocated agent.

Yet another aspect of the present invention is a callback system that includes an automatic call distributor connected to a telephone network and in direct communication with both a predictive dialer and a CTI server. The system further includes one or more agents also connected to the automatic call distributor. The predictive dialer is also connected to the telephone network and in direct communication with the CTI server. Once an outbound callback call results in a connection that is determined to be answered by a person, then the CTI server allocates an agent to handle the call, and the agent is routed the call from the predictive dialer to the automated call distributor and through the automatic call distributor to the allocated agent.

BRIEF DESCRIPTION OF THE DRAWINGS

Figure 1:
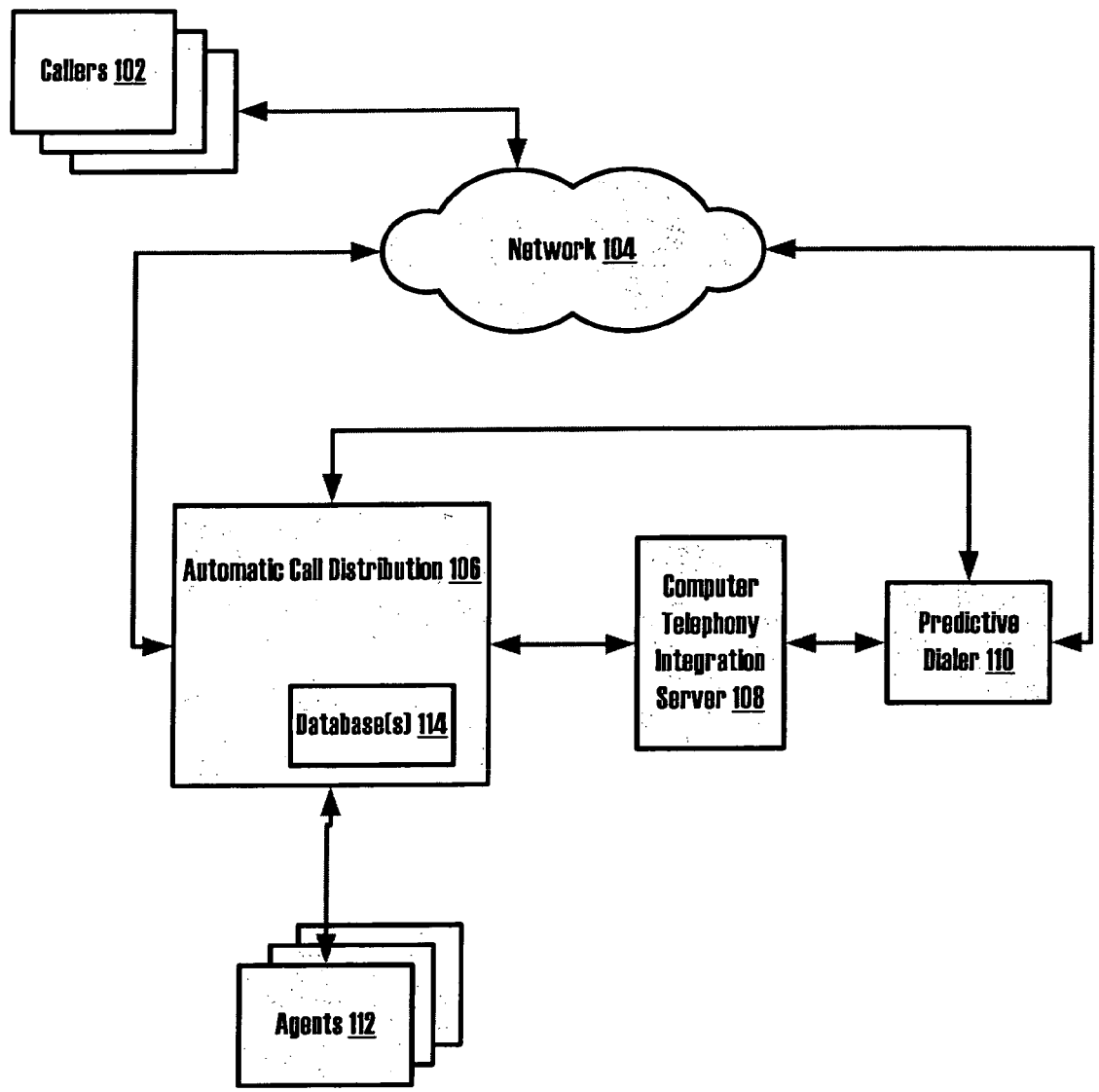

Having thus described the invention in general terms, reference will now be made to the accompanying drawings, which are not necessarily drawn to scale, and wherein:

FIG. 1 is a functional block diagram showing callers in communication with agents through a network and call center, in accordance with an exemplary embodiment of the present invention.

Figure 2:
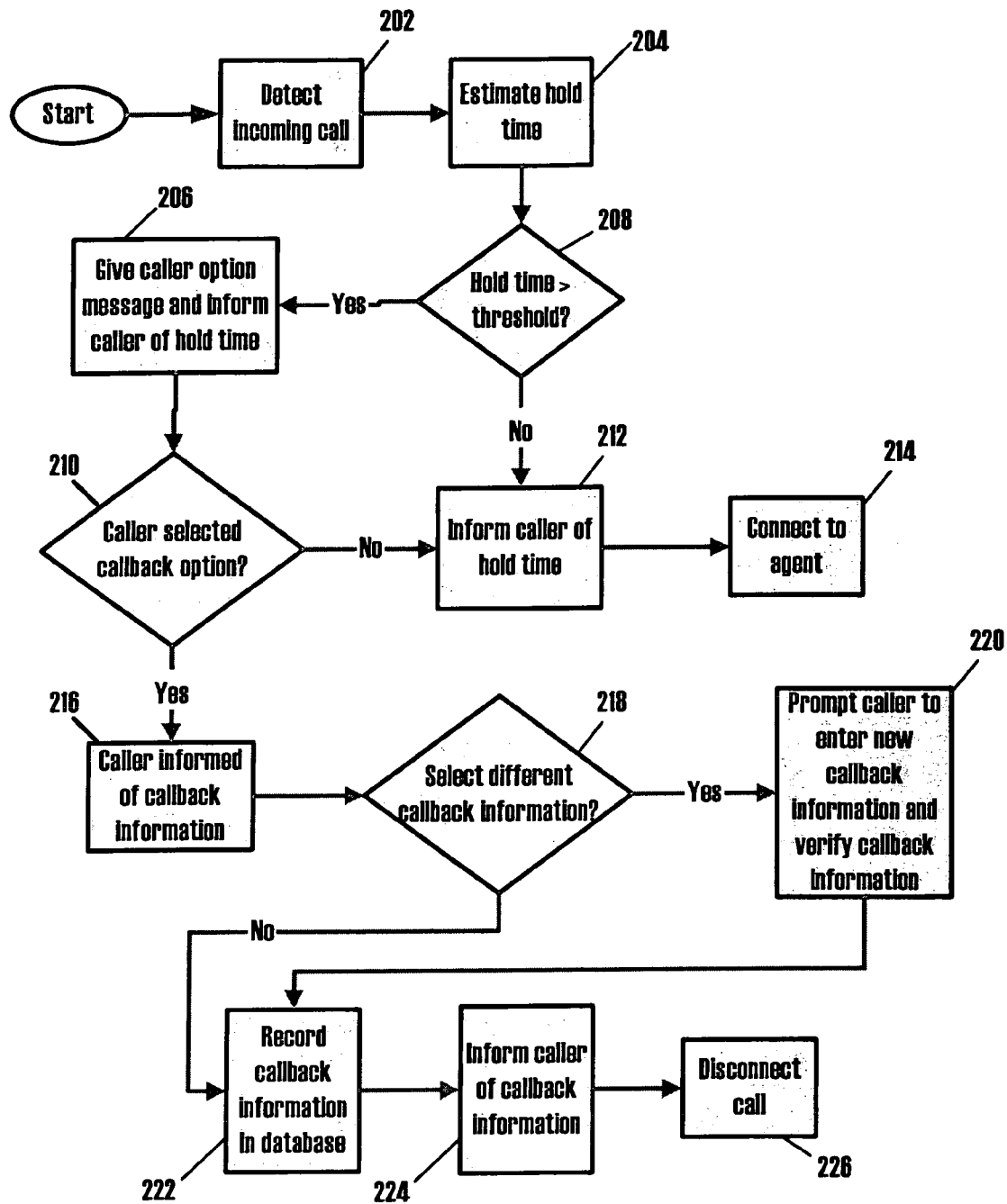

FIG. 2 is a flowchart of a callback scheduling process which occurs when all agents of the call center are unavailable, in accordance with an exemplary embodiment of the present invention.

Figure 3:
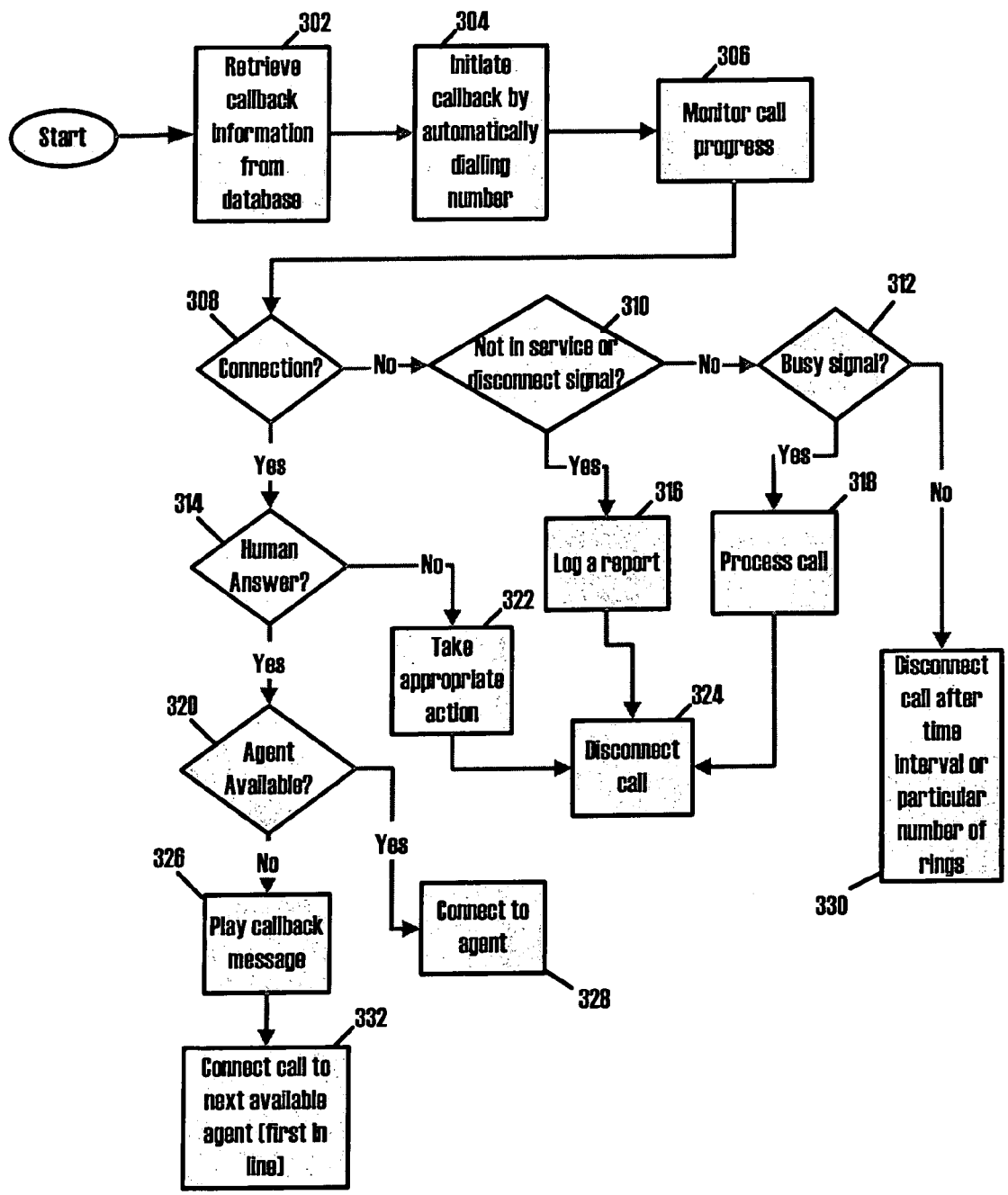

FIG. 3 is a flowchart of a callback process which occurs when a scheduled callback is to occur, in accordance with an exemplary embodiment of the present invention.

DETAILED DESCRIPTION OF THE INVENTION

The present invention comprises methods and systems that automatically handle the answering of inbound phone calls and automatically handle outbound phone calls. The system can comprise a stand alone system handling both inbound and outbound phone calls or it can comprise a separate system (e.g., an add-on) used in communication with a company's existing server already handling inbound calls.

FIG. 1 is a functional block diagram showing callers in communication with agents through a network and call center, in accordance with an exemplary embodiment of the present invention. FIGS. 2 and 3 show an exemplary embodiment of a callback method in accordance with an embodiment of the present invention. The present invention is described below with reference to figures and flowchart illustrations of systems, methods, apparatuses and computer program products according to an embodiment of the invention. It will be understood that each block of the flowchart illustrations, and combinations of blocks in the flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions. The inventions may be implemented through an application program running on an operating system of a computer. The inventions also may be practiced with other computer system configurations, including hand-held devices, multiprocessor systems, microprocessor based or programmable consumer electronics, mini-computers, mainframe computers, etc.

Application programs that are components of the invention may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network.

The present invention will now be described more fully hereinafter with reference to the accompanying figures, in which like numerals indicate like elements throughout the several drawings. Some, but not all embodiments of the invention are described. Indeed, these inventions may be embodied in many different forms and should not be construed as limited to the embodiments set forth herein; rather, these embodiments are provided so that this disclosure will satisfy applicable legal requirements, be thorough and complete, and will fully convey the scope of the invention to those skilled in the art.

System Description

FIG. 1 shows an exemplary schematic block diagram of a system in accordance with an embodiment of the present invention that is configured as an add-on to an existing call center. In this embodiment, a caller 102 places a call over an analog or digital telephone network 104 (e.g., the PSTN) or by utilizing voice over IP (VOIP), and the call is answered by the ACD 106, which normally will route the call to receiving agents 112 to service the call. The ACD can be one of the numerous suitable ACDs offered commercially by manufacturers such as Aspect, Avaya, Nortel Networks, Seimens, Alcatel as well as others. The Computer Telephony Integration (CTI) Server 108 can instruct the ACD 106 to re-allocate its agents to handle callbacks, which allows a caller to schedule a time the system will automatically call them back and service the caller's needs as if the caller remained waiting on the line. The CTI Server 108 can be any suitable CTI server, such as a CTI Blended Agent gateway manufactured by Noble Systems or CT Connect from Intel Dialogic, Callpath from IBM, Avaya ASAI link, Nortel Symposium, etc. The callback information including the time of the scheduled callback, the phone number to call at that time, identification data associated with the phone number, etc. are stored in a database 114, which can be located on the CTI Server 108, on the ACD 106 (as shown in FIG. 1), or remote from the system. The database 114 can be a suitable database, such as an Informix database by IBM, an Oracle database, Microsoft SQLServer, etc.

Once a callback feature in accordance with an embodiment of the present invention is initiated, and it is time for a callback, then the CTI server 108 instructs the ACD 106 to designate one or more agents 112 available for handling the outbound callbacks. This results in the designated agents 112 being temporarily unavailable to receive inbound calls. These designated agents' phones are then immediately connected to a predictive dialer 110 through a bi-directional voice link (e.g., using one or more lines of a T1) connecting the ACD 106 directly to the predictive dialer 110, so that when the predictive dialer 110 places the callbacks and the called party answers, the audio connection is immediately made between the called party and the designated agent 112. Moreover, the predictive dialer 110 or additional processor such as a digital signal processor, ASIC, programmable IC (PIC), along with the use of analog to digital converters and/or digital to analog converters can monitor the phone line to determine if the outbound call was answered by a person, an answering machine, or resulted in a busy signal, disconnected signal, not in service signal, etc. Such additional processor may be located in the predictive dialer 110, ACD 106, CTI Server 108, or housed separate from all three. Additionally, the determination of whether or not an answering machine answered the outbound call could be conducted by monitoring the length of time it takes for a connection to occur or how many rings occur before a connection, etc. Traditional methods for detecting the difference between an answering machine and a human answering a telephone line, are described in U.S. Pat. Nos. 5,371,787 and 5,724,420 among others. The predictive dialer 110 can be any suitable dialer, such as an ATOMS product by Noble Systems, a Mosaix dialer from Avaya, or ePro or Unison dialers from Concerto, etc.

The CTI server 108 may monitor the number of callbacks that are in process and those about to be made, and based at least partially thereon adjusting the number of agents 112 available to handle the callbacks as necessary. Also, the predictive dialer 110 may make callbacks independent from the control of the CTI server 108. The predictive dialer 110 will automatically make the callbacks at the appropriate time, unless some other process alters the callback schedule stored in a callback database 114. For example, the CTI server 108 or some other process could update the callback database 114 if some significant event happened (power failure or fire drill, etc.). Under those or similar circumstances, the predictive dialer 110 could be directed not to make the callbacks. Notifying the designated agent 112 that the call is a callback may occur via a local area network (LAN) or other connection to the agents desktop PC or terminal.

In an alternative embodiment of the present invention the control functions of the CTI server 108 may be allocated to the ACD 106, the predictive dialer 110 or both, or even another processor remote from the ACD 106 and predictive dialer 110. For example, the ACD 106 and predictive dialer 110 could be configured to communicate with each other directly to allocate agents 112, route calls to agents 112, and control the processes of the callback system. Thus, the need for the CTI-server 108 in implementing the callback process described in detail below may be circumvented with modification by one of ordinary skill in the art. Moreover, agents 112 could be connected directly to the predictive dialer 110 and/or the CTI server 108 while still be utilized to implement various functions of the callback method described in further detail below.

In an exemplary embodiment of a call center system in accordance with an embodiment the present invention shown in FIG. 1, the system receives phone calls at the ACD 106 that are handled by inbound call receiving agents 112. As the amount of phone calls being received exceeds the number of available receiving agents a holding queue is established. An estimated hold time is calculated using simple or complex algorithms which may include utilizing system monitored data such as average length of typical calls, number of agents on duty at a specific time, etc. Once the estimated hold time reaches a predetermined length and/or number of calls, then the CTI Server 108 initiates and controls a callback feature option in accordance with the present invention, which allows new callers to have the option of receiving a callback at a later time. The callback can be made to a caller-specified number at the time the caller would have expected to be sent to an agent 112 if she had stay in the holding queue based on estimated hold times or at a time suggested by the system or at a time selected by the caller.

In an alternative embodiment of the present invention, the callback option could be implemented as a special convenience for select customers, subscribers, or those who meet certain customer criteria, which may be based on the telephone number being dialed or called from, customers with an existing account, customers who subscribed to the service or a benefits package that includes the service, or based on a particular customer status level, or based on alternative or additional criteria as appreciated by one of ordinary skill in the art.

As new callers select the callback option and the time for scheduled callbacks begins, a certain number of receiving agents 112 are re-assigned by the CTI server 108 as outbound call agents to handle the callbacks, which are automatically placed by the predictive dialer 110 at the scheduled callback time. The number of re-assigned agents 112 can be based on the amount of callbacks needed to be made, or on estimations made using system data and/or statistical algorithms such that the number of outbound call agents may be less than the number of callbacks to be made at any given time (to account for callbacks that will result in no answer, answering machine, busy signal, a service signal such as a disconnected or not in service signal, etc.)

As agents 112 are reallocated and callbacks are made the estimated hold time for new callers is adjusted for this decrease in available agents to handle the new incoming calls. Once the hold time is back to an acceptable level and the callbacks have been completed, then the callback agents may be re-assigned as receiving agents or for some other purpose. A more detailed description of the callback process of this system in accordance with an embodiment of the present invention is described below in connection with FIGS. 2 and 3.

The Callback Method

FIGS. 2 and 3 show an exemplary embodiment of a callback method in accordance with an embodiment of the present invention. FIG. 2 shows the process of scheduling a callback for a caller. As shown, the callback system begins by step 202 detecting an incoming call, and once a call has been detected an estimated hold time is calculated in step 204. The estimated hold time is the time expected before being connected to an available agent. The estimation of the hold time can be determined in numerous ways and can depend on many factors including the number of available agents, looking at the current maximum hold time for calls in the queue, the availability of only the agents with the skills required to handle the call and the number of agents currently possessing those skills, the incoming call volume and outgoing call volume (likely due to scheduled callbacks), subject matter of the call, average duration of a particular service call, or any other suitable method that could be used to calculate an estimated hold time.

Once the hold time has been determined, step 208 compares the hold time length with a preset threshold limit. If estimated hold time exceeds the preset threshold, the callback option is initiated in step 206, otherwise the caller is informed of the estimated hold time in step 212 before speaking to an available agent and then subsequently being connected to an agent in step 214. For example, if an acceptable hold time threshold has been set for 3 minutes and the estimated hold time is 2 minutes, the caller simply waits on the line for an agent and is not given the option of receiving a callback. However, if the estimated hold time was 6 minutes, the caller would be given the option to receive a callback at a later time, rather than wait on hold for the duration of the hold time. It is within the scope of the present invention that the preset threshold to be based at least in part on the number of calls on hold and/or the rate of incoming calls. It is also within the scope of the present invention that when a caller has been placed on hold step 212 may be skipped and step 214 may be invoked with step 212 being implemented. For example, if the estimated hold time is very short compared to preset threshold levels then a caller may be placed on hold without notice as to how long the hold time is and connected when an agent becomes available.

Once the callback option is initiated in step 206, the caller is played a message that tells them the estimated hold time before being sent to an agent and is given the option to either stay on the line in the holding queue or to select the option of receiving a callback at the time when the caller is estimated to be sent to an agent if they remained on the line. Step 210 determines if the caller selected the callback option. The caller may select the option in various ways, such as through pressing a key on the phone, saying the option selected or various interface modalities appreciable by one of ordinary skill in the art. For example, all input from the caller can be either touch tone or spoken voice depending on the technology deployed. If the caller did not select the callback option, then step 212 is invoked and the caller remains on hold on the line. However, if the caller selects the option for a callback then step 216 is initiated. In alternative embodiments of the present invention, the caller may at any point during the time the caller is holding decide to select the callback option and proceed with step 216.

It is within the scope of the present invention that the callback scheduling beginning in step 216 may begin without giving the caller the option to hold. Hence, steps 206 and 210 may be skipped or not implemented provided certain conditions are met. Thus, skipping the step of presenting the caller with the option to hold may occur when certain conditions are met. For example, the callback feature can be initiated when the call is made outside normal operating business hours, regardless of an estimated hold time. As a result, an "after hours" callback scheduler may schedule calls for the following business day, rather than give the caller the option of waiting on the line. Another example of when a caller may not be given the option to hold is when the system would require the use of the callback scheduling feature to avoid a busy signal. For example, if the call center has 100 inbound lines and 50 inbound agents and 99 inbound lines are being utilized by callers on hold or talking to agents, the next inbound call would not be given the option to hold and would be prompted to schedule a callback, so that the system avoids having callers receive a busy signal when dialing in to the call center. Other scenarios where a caller would be prompted to schedule a callback without given the option to hold on the line would include when the system determines that the current hold times are excessively long (e.g., greater than a preset threshold), or when calls are determined to be of low priority based on information received from the caller, the telephone number dialed to or dialed from, or through the detection of other call related data. It is also within the scope of the present invention, that when a caller would be prompted to schedule a callback without given the option to hold on the line, the caller does not need to be informed of a hold time as described in step 206 or presented with the option to schedule a callback as in step 210 since such information is unnecessary, rather the call process can simply proceed to step 216.

In step 216, the caller is played a message that tells the caller the callback information including the number from which the caller is calling (i.e., the ANI) if the number from which the caller is calling is determinable. The callback information may also include a computed (or estimated) callback time. The computation of the callback time may be determined in numerous ways and can depend on many factors including the estimated hold time, the number of available agents, looking at the current maximum hold time for calls in the queue, the availability of only the agents with the skills required to handle the call and the number of agents currently possessing those skills, the incoming call volume and outgoing call volume (likely due to scheduled callbacks), subject matter of the call, average duration of a particular service call, or any other suitable method that could be used to calculate a callback time. In alternative embodiments of the invention, the algorithm of computing a callback time may utilize a variety of system parameters as well as system performance data including, the number of calls currently on the system, the number of calls estimated to be handled at a later time, the current and future availability of the system's agents, statistical and historical data relating to past performance of the system (e.g., the calls handled today average 2 minutes in duration, 30% of callbacks placed from 9 am to 12 pm on Mondays are unanswered, etc.) as well as utilizing other data relating to the call center system's operation.

Alternatively, or in addition to, the exemplary embodiment of the invention, the system may at this time acquire callback information by prompting the caller to enter one or more pieces of identifying information such as a callback number, callback time, name, purpose of call, etc. Next, step 218 informs the caller of the callback information, such as the computed call back time, and asks the caller if the callback information is correct or satisfactory, or if the caller would like to submit different callback information such as a different callback number, specific callback time, etc. For example, the system may ask if the caller wishes to be called back at this number or a different number. Another example includes the caller selecting a different callback time (or day and time) if the estimated time for the callback is not convenient.

Alternatively, or in addition to, the exemplary embodiment of the invention, the caller may select an alternate callback time for initiating the callback if the computed callback time is unacceptable to caller. The caller selected day and time can also be validated against a database to confirm that agents are scheduled to be available to service the call at the selected day and time. If the caller wishes to select a different number (or if the ANI is not determinable), the system acquires callback information (e.g., phone number, time to call, customer name, etc.) to schedule an alternative time for callback, or to specify additional callback information (e.g., the purpose of the call), then step 220 is invoked to prompt the caller to enter or say the callback information they wish to change. Additionally, the caller may be prompted for additional identifying information (such as an account number, etc.) that can be delivered to the agent for use when handling the callback to the caller. Additional features such as providing a next available callback time or having the caller select the subject matter of the call and/or describe the purpose of the call may also be incorporated into steps 216, 218, and/or 220. Similar features will be appreciated by one of ordinary skill in the art.

Once the callback information has been approved by the caller in either step 218 or 220, step 222 is invoked causing the callback information including the callback number (whether original ANI or newly gathered) along with the callback time is recorded in a database. Other data associated with the callback may also be recorded in the database. Next, step 224 is invoked to play the caller a message that says that they will be called back in [time interval] at [phone number], and then step 226 is invoked to disconnect the call.

In addition, the caller may be provided with a numerical priority code and/or a phone number to utilize if the caller misses the scheduled callback, that is, the number and/or code can be used when calling into the system again at a later time. This number and/or code may be utilized for any number of reasons such as to identify the caller, to identify the caller as a callback participant, to prioritize the call ahead of others in the holding queue, to immediately provide the caller with the callback option to reschedule another callback, etc.

FIG. 3 describes the process of placing the scheduled callback in accordance with an embodiment of the present invention. With reference to FIG. 3, when the scheduled callback time arrives for any such scheduled callback, step 302 is invoked to retrieve the stored callback number and possibly other associated data from its stored location in the database. Next, step 304 initiates a callback by automatically dialing the retrieved callback number. Once the number is dialed, the call progress is monitored in steps 306, 308, 310, 312, and 314 to determine if it results in a no answer, busy, not in service, answering machine, or a human answer. If the call is not answered by a person, the call may be handled by predetermined rules depending on the call result. For example, busies can be retried every M minutes, not in service numbers can be output to a report or logged if desired, no answers can be retried every hour, and answering machines/voicemails can be left an automated message by the system that has been pre-recorded, such as "this is XYZ company and we were returning your call, please call us back at your convenience at 800-xxx-xxxx)." These are example rules only, and one of ordinary skill in the art would appreciate that other rules, time intervals, contingencies, etc. may be implemented and are within the scope of the present invention.

If the call results in no connection and a service signal (e.g., disconnected or not in service signal) is detected by step 310, then step 316 logs the result in a report and stores it in the database, and step 324 ends the call. If the call results in a no connection and step 312 detects a busy signal, then step 318 is invoked to process the call (e.g., flag the number as one that needs to be tried again after a certain interval of time) and step 324 ends the call. If no connection occurs and does not result in a busy signal or a service signal (e.g., disconnected or not in service signal), then step 330 is invoked to end the call after either a certain number of rings or particular time interval.

If the call results in a connection as detected by step 308, then step 314 determines if the call resulted in a human answer or not. If not, then step 322 is invoked to take appropriate action depending on the type of connection that has occurred (e.g., answer machine, voicemail, answering services such as a privacy director, etc.) If the call results in a human answer, then step 320 determines if an agent is immediately available. If an agent is immediately available then step 328 is invoked to connect the call to the available agent. When the call is connected to the agent, it is within the scope of the present invention that the agent receives an indicator that identifies this call as a callback. This can be either a message on their screen, a different script on their screen, or what is known as a "whisper on connect", whereby the agent hears a whisper message in their headset when the call is connected, such as "callback." This whisper message cannot be heard by the caller.

However, if the call is answered and there are no agents immediately available to take the call, step 326 is invoked and a message is played that says, for example, "this is your callback from [company name], we will now connect you", and the call is then switched to the next available agent in step 332 as soon as any agent completes the call they are currently servicing. In the illustrative embodiment, they are connected to the next available agent, as it is within the scope of the present invention that the called back party does not enter the then existing queue of calls waiting to be serviced by agents. In addition, the message played may include additional information such as advertisements, product information, instructions (e.g., have you account number ready), etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of conducting a callback, comprising:
receiving an inbound call from a caller on a day to be handled by one of a plurality of inbound call receiving agents;
determining by at least one computer processor whether the inbound call is received during a particular time period of the day; determining by the at least one computer processor whether the inbound call is of low priority based on at least one of information received from the caller and a telephone number associated with the inbound call;
based at least in part on (1) determining the inbound call is received during the particular time period of the day and (2) determining the inbound call is of low priority, requiring the caller to accept a callback option; and
upon the caller accepting the callback option:
retrieving at least a callback telephone number associated with the caller;

in response to at least one scheduled callback, reassigning one or more of the plurality of inbound call receiving agents as one or more outbound call agents, wherein the one or more outbound call agents are unavailable to handle inbound calls;

initiating an outbound callback call for the callback by automatically dialing the callback telephone number associated with the caller;

in response to a human answer of the outbound callback call being detected, routing the outbound callback call to one of the one or more outbound call agents; in response to a not in service signal being detected for the outbound callback call, preventing further outbound callback calls to the callback telephone number.

2. The method of claim 1 further comprising retrieving callback information associated with the callback, wherein the callback information comprises customer identifying information for the caller, and providing the customer identifying information to the one of the one or more outbound call agents.

3. The method of claim 2, wherein the callback information comprises data relating to a subject matter of the inbound call, and the method further comprises providing at least a portion of the data relating to the subject matter of the inbound call to the one of the one or more outbound call agents.

4. The method of claim 1 further comprising determining the outbound callback call results in a connection to an answering machine by monitoring a number of rings that occurs before the connection is detected or by a length of time that elapses before the connection is detected.

5. The method described in claim 1, further comprising displaying callback information to the one of the one or more outbound call agents, wherein the callback information comprises at least one of caller identifying information and data relating to a subject matter of the inbound call.

6. The method of claim 1, further comprising, upon detection of a busy signal, initiating a follow-up outbound callback call to the callback telephone number after a predetermined length of time.

7. The method of claim 1, further comprising, upon detection of a not in service signal, preventing further outbound callback calls to the callback telephone number.

8. The method of claim 1, further comprising, upon detection of a predetermined number of rings, waiting a predetermined length of time and then initiating a subsequent outbound callback call to the callback telephone number.

9. A callback system comprising:
an automatic call distributor (ACD) configured to receive an inbound call from a caller on a day to be handled by one of a plurality of inbound call receiving agents, determining by at least one computer processor whether the inbound call is received during a particular time period of the day; determine whether the inbound call is of low priority based on at least one of information received from the caller and a telephone number associated with the inbound call, and based at least in part on (1) determining the inbound is received during the particular time period of the day and (2) determining the inbound call is of low priority, require the caller to accept a callback option;

a computer telephony integration (CTI) server configured to, in response to at least one scheduled callback, re-assign one or more of the plurality of inbound call receiving agents as one or more outbound call agents, wherein the one or more outbound call agents are unavailable to handle inbound calls; and a predictive dialer configured to, upon the caller accepting the callback option, place an outbound callback call over a network by automatically dialing a callback telephone number associated with the caller, wherein in response to a human answer of the outbound callback call being detected, the predictive dialer is configured to route the outbound callback call to one of the one or more outbound call agents; in response to a not in service signal being detected for the outbound callback call, preventing further outbound callback calls to the callback telephone number.

10. A callback system comprising:
an automatic call distributor (ACD) configured to receive inbound calls;
a computer telephony integration (CTI) server in direct communication with a predictive dialer;
the predictive dialer in direct communication with a network, and configured to place outbound callback calls on the network; and
a processor configured to monitor a placed outbound callback call for a connection, wherein:
the ACD receives an inbound call from a caller on a day to be handled by one of a plurality of inbound call receiving agents, determining by at least one computer processor whether the inbound call is received during a particular time period of the day; determines whether the inbound call is of low priority based on at least one of information received from the caller and a telephone number associated with the caller, and based at least in part on (1) determining the inbound is received during the particular time period of the day and (2) determining the inbound call is of low priority, requires the caller to accept a callback option,
the CTI server, in response to at least one scheduled callback, re-assigns one or more of the plurality of inbound call receiving agents as one or more outbound call agents that are unavailable to handle inbound calls,
the predictive dialer, upon the caller accepting the callback option, places an outbound callback call on the network to the caller, and
in response to the processor detecting a connection of a human answer for the outbound callback call, the CTI server routes the outbound callback call to one of the one or more outbound call agents; in response to a not in service signal being detected for the outbound callback call, preventing further outbound callback calls to the callback telephone number.

11. The callback system of claim 10, wherein the predictive dialer or the CTI server includes the processor.

12. A method of conducting a callback,
comprising:
accepting an inbound call from a caller on a day over a telephone line to be handled by one of a plurality of inbound call receiving agents;
calculating an estimated hold time in a queue before transfer of the inbound call to one of the plurality of inbound call receiving agents;
determining by at least one computer processor whether the inbound call is received during a particular time period of the day; determining by the at least one computer processor whether the inbound call is of low priority based on at least one of information received from the caller and a telephone number associated with the inbound call;
based at least in part on (1) determining the inbound is received during the particular time period of the day and (2) determining the inbound call is of low priority, requiring the caller to accept a callback option;

based at least in part on determining the inbound call is not of low priority and on the estimated hold time exceeding a predetermined value, presenting the caller with the callback option and with an option to continue to hold for one of the plurality of inbound call receiving agents; and upon the caller accepting the callback option:
acquiring a callback telephone number;
in response to at least one scheduled callback, re-assigning one or more of the plurality of inbound call receiving agents as one or more outbound call agents, wherein the one or more outbound call agents are unavailable to handle inbound calls;
initiating the outbound callback call to the caller by automatically dialing the callback telephone number by a dialing device;
in response to a human answer of the outbound callback call being detected, routing the outbound callback call to one of the one or more outbound call agents; in response to a not in service signal being detected for the outbound callback call, preventing further outbound callback calls to the callback telephone number.

13. The method of claim 12, further comprising presenting the caller with an option of scheduling an alternate callback time for initiating the outbound callback call if a set callback time is unacceptable to the caller; after receiving an alternate callback time, receiving a plurality of alternate callback information from the caller, providing a next available callback time for the caller to select as the alternate callback time; and initiating the outbound callback call at the alternate callback time.

14. The method of claim 12, further comprising acquiring a plurality of callback information including at least one of caller identifying information and a subject matter of the inbound call.

15. The method of claim 12, further comprising verifying at least a portion of a plurality of callback information acquired from the caller by presenting the at least a portion of the plurality of callback information to the caller.

16. A method of conducting a callback, comprising:
accepting an inbound call from a caller on a day to be handled by one of a plurality of inbound call receiving agents;
calculating an estimated hold time in a queue before transfer of the inbound call to one of the plurality of inbound call receiving agents;
determining by at least one computer processor whether the inbound call is received during a particular time period of the day; determining by the at least one computer processor whether the inbound call is of low priority based on at least one of information received from the caller and a telephone number associated with the inbound call;
based at least in part on (1) determining the inbound is received during the particular time period of the day and (2) determining the inbound call is of low priority, requiring the caller to accept a callback option;
based at least in part on determining the inbound call is not of low priority and on call data and the estimated hold time, presenting the caller with the callback option; and
upon the caller accepting the callback option:
acquiring a callback telephone number;
in response to at least one scheduled callback, re-assigning one or more of the plurality of inbound call receiving agents as one or more outbound call agents, wherein the one or more outbound call agents are unavailable to handle inbound calls;
initiating the outbound callback call to the caller by automatically dialing the callback telephone number;
in response to a human answer of the outbound callback call being detected, routing the outbound callback call to one of the one or more outbound call agent; in response to a not in service signal being detected for the outbound callback call, preventing further outbound callback calls to the callback telephone number.

17. The method of claim 16, further comprising verifying at least a portion of a plurality of callback information acquired from the caller by presenting the at least a portion of the plurality of callback information to the caller.

18. The method of claim 16, further comprising acquiring a plurality of callback information including at least one of caller identifying information and data relating to a subject matter of the inbound call.

19. The method of claim 16, wherein presenting the caller with the callback option is based on caller data selected from one or more of a customer telephone number, an account number, and a customer status level.

20. A non-transitory computer-readable storage medium comprising computer-executable instructions for conducting a callback, the computer-executable instructions configured, when executed by at least one computer processor, to:
receive an inbound call from a caller on a day to be handled by one of a plurality of inbound call receiving agents;
determining by at least one computer processor whether the inbound call is received during a particular time period of the day; determine whether the inbound call is of low priority based on at least one of information received from the caller and a telephone number associated with the inbound call;
based at least in part on (1) determining the inbound is received during the particular time period of the day and (2) determining the inbound call is of low priority, require the caller to accept a callback option; and
upon the caller accepting the callback option:
in response to at least one scheduled callback, re-assign one or more of the plurality of inbound call receiving agents as one or more outbound call agents, wherein the one or more outbound call agents are unavailable to handle inbound calls;
initiate an outbound callback call for the callback by having a callback telephone number for the caller dialed;
in response to a human answer of the outbound callback call being detected, route the outbound callback call to one of the one or more outbound call agents; in response to a not in service signal being detected for the outbound callback call, preventing further outbound callback calls to the callback telephone number.

21. A non-transitory computer-readable storage medium comprising computer-executable instructions for conducting a callback, the computer-executable instructions configured, when executed by at least one computer processor, to:
after an inbound call has been received from a caller on a day to be handled by one of a plurality of inbound call receiving agents, calculate an estimated hold time in a queue before transfer of the inbound call to one of the plurality of inbound call receiving agents;

determine whether the inbound call is received during a particular time period of the day; determine whether the inbound call is of low priority based on at least one of information received from the caller and a telephone number associated with the inbound call;

based at least in part on determining the inbound call is of low priority, requiring the caller to accept a callback option;

based at least in part on (1) determining the inbound is received during the particular time period of the day and (2) determining the inbound call is not of low priority and on the estimated hold time exceeding a predetermined value, present the caller with the callback option or an option to continue to hold for one of the plurality of inbound call receiving agents; and upon the caller accepting the callback option:

in response to at least one scheduled callback, re-assign one or more of the plurality of inbound call receiving agents as one or more outbound call agents, wherein the one or more outbound call agents are unavailable to handle inbound calls;

initiate an outbound callback call to the caller;

in response to a human answer of the outbound callback call being detected, route the outbound callback call to one of the one or more outbound call agents; in response to a not in service signal being detected for the outbound callback call, preventing further outbound callback calls to the callback telephone number.

22. A non-transitory computer-readable storage medium comprising computer-executable instructions for conducting a callback, the computer-executable instructions configured, when executed by at least one computer processor, to:

after an inbound call has been received from a caller on a day to be handled by one of a plurality of inbound call receiving agents, calculate an estimated hold time in a queue before transfer of the inbound call to one of the plurality of inbound call receiving agents;

determine whether the inbound call is received during a particular time period of the day; determine whether the inbound call is of low priority based on at least one of information received from the caller and a telephone number associated with the inbound call;

based at least in part on (1) determining the inbound is received during the particular time period of the day and (2) determining the inbound call is of low priority, requiring the caller to accept a callback option;

based at least in part on determining the inbound call is not of low priority and on call data and the estimated hold time, present the caller with the callback option; and upon the caller accepting the callback option:

in response to at least one scheduled callback, re-assign one or more of the plurality of inbound call receiving agents as one or more outbound call agents, wherein the one or more outbound call agents are unavailable to handle inbound calls;

initiate an outbound callback call to the caller;

in response to a human answer of the outbound callback call being detected, route the outbound callback call to one of the one or more outbound call agents; in response to a not in service signal being detected for the outbound callback call, preventing further outbound callback calls to the callback telephone number.

23. The method of claim 1, wherein the one or more outbound call agents comprises at least two outbound call agents, and the step for routing the outbound callback call to one of the one or more outbound call agents involves:

determining whether an outbound call agent in the one or more outbound call agents is immediately available to handle the outbound callback call;

routing the outbound callback call to the outbound call agent if the outbound call agent is immediately available; and routing the outbound callback call to a next available outbound call agent of the one or more outbound call agents after the next available outbound call agent completes handling a previous outbound callback call and becomes available if the outbound call agent is not immediately available.

24. The method of claim 23, wherein the outbound callback call is routed to the next available outbound call agent without placing the outbound callback call in a then-existing queue of inbound calls waiting to be handled by the plurality of inbound call receiving agents.

25. The callback system of claim 9, wherein the one or more outbound call agents comprises at least two outbound call agents, and the predictive dialer is configured to route the outbound callback call to one of the one or more outbound call agents by determining whether an outbound call agent of the one or more outbound call agents is immediately available to handle the outbound callback call, route the outbound callback call to the outbound call agent if the outbound call agent is immediately available, and route the outbound callback call to a next available outbound call agent of the one or more outbound call agents after the next available outbound call agent completes handling a previous outbound callback call and becomes available if the outbound call agent is not immediately available.

26. The callback system of claim 25, wherein the outbound callback call is routed to the next available outbound call agent without placing the outbound callback call in a then-existing queue of inbound calls waiting to be handled by the plurality of inbound call receiving agents.

27. The callback system of claim 10, wherein the one or more outbound call agents comprises at least two outbound call agents, and the CTI server routes the outbound callback call to one of the one or more outbound call agents by determining whether an outbound call agent of the one or more outbound call agents is immediately available to handle the outbound callback call, route the outbound callback call to the outbound call agent if the outbound call agent is immediately available, and route the outbound callback call to a next available outbound call agent of the one or more outbound call agents after the next available outbound call agent completes handling a previous outbound callback call and becomes available if the outbound call agent is not immediately available.

28. The callback system of claim 27, wherein the outbound callback call is routed to the next available outbound call agent without placing the outbound callback call in a then-existing queue of inbound calls waiting to be handled by the plurality of inbound call receiving agents.

29. The method of claim 12, wherein the one or more outbound call agents comprises at least two outbound call agents, and the step for routing the outbound callback call to one of the one or more outbound call agents involves:

determining whether an outbound call agent of the one or more outbound call agents is immediately available to handle the outbound callback call;

routing the outbound callback call to the outbound call agent if the outbound call agent is immediately available; and routing the outbound callback call to a next available outbound call agent of the one or more outbound call agents after the next available outbound call agent completes handling a previous outbound callback call and becomes available if the outbound call agent is not immediately available.

30. The method of claim 29, wherein the outbound callback call is routed to the next available outbound call agent without placing the outbound callback call in the queue of inbound calls waiting to be handled by the plurality of inbound call receiving agents.

31. The method of claim 16, wherein the one or more outbound call agents comprises at least two outbound call agents, and the step for routing the outbound callback call to one of the one or more outbound call agents involves:

determining whether an outbound call agent of the one or more outbound call agents is immediately available to handle the outbound callback call;

routing the outbound callback call to the outbound call agent if the outbound call agent is immediately available; and routing the outbound callback call to a next available outbound call agent of the one or more outbound call agents after the next available outbound call agent completes handling a previous outbound callback call and becomes available if the outbound call agent is not immediately available.

32. The method of claim 31, wherein the outbound callback call is routed to the next available outbound call agent without placing the outbound callback call in the queue of inbound calls waiting to be handled by the plurality of inbound call receiving agents.

33. The non-transitory computer-readable storage medium of claim 20, wherein the one or more outbound call agents comprises at least two outbound call agents and the computer-executable instructions for routing the outbound callback call to one of the one or more outbound call agents are configured, when executed by the at least one computer processor, to:

determine whether an outbound call agent of the one or more outbound call agents is immediately available to handle the outbound callback call;

route the outbound callback call to the outbound call agent if the outbound call agent is immediately available; and route the outbound callback call to a next available outbound call agent of the one or more outbound call agents after the next available outbound call agent completes handling a previous outbound callback call and becomes available if the outbound call agent is not immediately available.

34. The non-transitory computer-readable storage medium of claim 33, wherein the outbound callback call is routed to the next available outbound call agent without placing the outbound callback call in a then-existing queue of inbound calls waiting to be handled by the plurality of inbound call receiving agents.

35. The non-transitory computer-readable storage medium of claim 21, wherein the one or more outbound call agents comprise at least two outbound call agents and the computer-executable instructions for routing the outbound callback call to one of the one or more outbound call agents are configured, when executed by the at least one computer processor, to:

determine whether an outbound call agent of the one or more outbound call agents is immediately available to handle the outbound callback call;

route the outbound callback call to the outbound call agent if the outbound call agent is immediately available; and route the outbound callback call to a next available outbound call agent of the one or more outbound call agents after the next available outbound call agent completes handling a previous outbound callback call and becomes available if the outbound call agent is not immediately available.

36. The non-transitory computer-readable storage medium of claim 35, wherein the outbound callback call is routed to the next available outbound call agent without placing the outbound callback call in the queue of inbound calls waiting to be handled by the plurality of inbound call receiving agents.

37. The non-transitory computer-readable storage medium of claim 22, wherein the one or more outbound call agents comprise at least two outbound call agents and the computer-executable instructions for routing the outbound callback call to one of the one or more outbound call agents, when executed by the at least one computer processor, cause the at least one computer processor to:

determine whether an outbound call agent of the one or more outbound call agents is immediately available to handle the outbound callback call;

route the outbound callback call to the outbound call agent if the outbound call agent is immediately available; and route the outbound callback call to a next available outbound call agent of the one or more outbound call agents after the next available outbound call agent completes handling a previous outbound callback call and becomes available if the outbound call agent is not immediately available.

38. The non-transitory computer-readable storage medium of claim 37, wherein the outbound callback call is routed to the next available outbound call agent without placing the outbound callback call in the queue of inbound calls waiting to be handled by the plurality of inbound call receiving agents.

* * * * *